Feb. 25, 1964  J. R. WAKELIN  3,122,387
LOCKS
Filed Oct. 25, 1962

INVENTOR.
John R. Wakelin
BY
Roberts, Cushman & Grover
ATT'YS

United States Patent Office 3,122,387
Patented Feb. 25, 1964

3,122,387
LOCKS
John R. Wakelin, Southboro, Mass., assignor to Dennison Manufacturing Company, Framingham, Mass., a corporation of Massachusetts
Filed Oct. 25, 1962, Ser. No. 233,095
2 Claims. (Cl. 292—202)

While this invention is especially adapted to interlock the upper and lower sashes of a window, it may also be used to interlock other relatively movable parts having a crack therebetween, such as a door and a casing.

Objects of the invention are to provide a lock which is simple and economical to produce, which can be installed easily and quickly, which can be mounted in accurate position by an inexperienced person, and which is durable and reliable in use.

According to the present invention the lock comprises interlocking male and female members for attachment to sashes or other parts respectively, the members having a connector bridging the aforesaid crack and joining the two members together while being mounted so as to space them the correct distance apart, the connector being frangible so that it can be broken after the members are mounted. Preferably one of the members also has a lip extending into the aforesaid crack so as to locate the members transversely of the crack. In the preferred embodiment the members are made of flexible material with integral tubes for screws, the lower ends of the tubes fitting the lower ends of the screws and being split to permit expansion as the screws are threaded into the parts.

Figure 1:
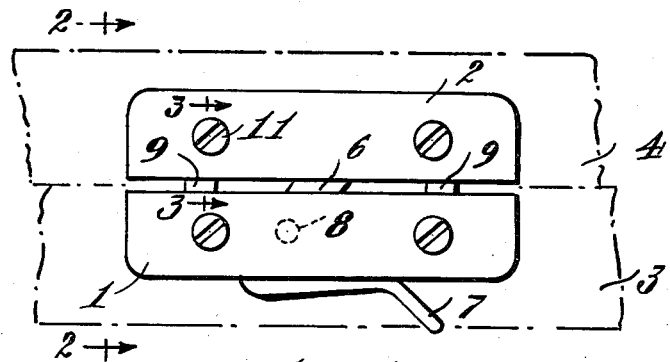
Figure 2:
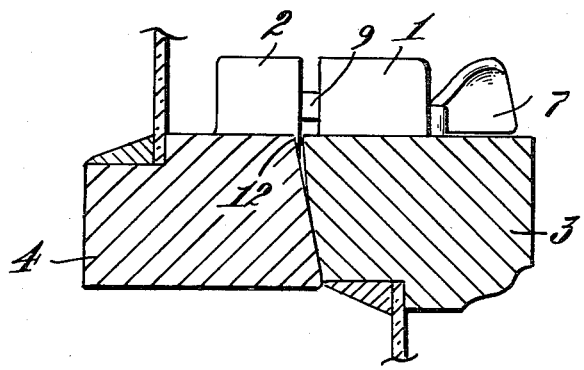

For the purpose of illustration a typical embodiment of the invention is shown in the accompanying drawings in which FIG. 1 is a plan view;
FIG. 2 is a section on line 2—2 of FIG. 1; and
FIG. 3 is a section on line 3—3 of FIG. 1.

The particular embodiment of the invention chosen for the purpose of illustration comprises male and female parts 1 and 2 for attachment to lower and upper sashes 3 and 4, the male part 1 having the usual latch 6 actuated by a handle 7 pivoted at 8 in the usual manner. According to this invention the two members 1 and 2 are interconnected by bridges 9 for holding the members in predetermined spaced relationship to each other. These bridges are frangible so that they may be broken easily after the members have been secured to the sashes by means of screws 11. The female member 2 is also provided with a lip 12 adapted to extend into the crack between the two sashes thereby to locate the members transversely of the crack while they are being attached. Preferably the entire lock is made of plastic material, the bridges 9 and lip 12 being molded integrally with the members 1 and 2.

Figure 3:
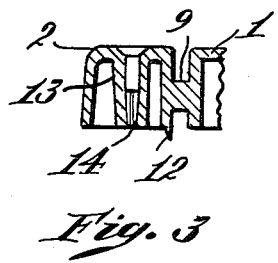

As shown in FIG. 3 the members 1 and 2 have integral tubes 13 to receive the screws 11, the lower end of each tube being shaped to fit the threaded end of the screw so as to hold the screw centered while being inserted, the lower end of the tube being split as shown at 14 to permit the tube to expand as the screw is threaded into the sash.

It should be understood that the present disclosure is for the purpose of illustration only and that this invention includes all modifications and equivalents which fall within the scope of the appended claims.

I claim:
1. For interlocking the upper and lower sashes of a window or other relatively movable parts having a crack therebetween, a lock comprising interlocking male and female members for attachment to the two parts respectively, characterized by a connector bridging said crack joining the two members together while being mounted, thereby to space them apart a predetermined distance, the connector being frangible so that it can be broken after the members are mounted.

2. A lock according to claim 1 further characterized by a lip on one of said members to extend into said crack, thereby to locate both members transversely of the crack.

References Cited in the file of this patent
UNITED STATES PATENTS

| | | |
|---|---|---|
| 362,152 | Ferren | May 3, 1887 |
| 1,197,228 | Nelson | Sept. 5, 1916 |
| 1,664,681 | Hancock | Apr. 3, 1928 |
| 2,102,230 | Waterman | Dec. 14, 1937 |
| 2,488,119 | Ferris | Nov. 15, 1949 |